US012692375B2

(12) United States Patent　(10) Patent No.:　US 12,692,375 B2

Son et al.　(45) Date of Patent:　Jul. 28, 2026

(54) LOW SHRINK TENSION FILM

(71) Applicants: SK Innovation Co., Ltd., Seoul (KR);
SK Geo Centric Co., Ltd., Seoul (KR)

(72) Inventors: Sang Ha Son, Daejeon (KR); **Yong
Zheng, Daejeon (KR); Doh Yeon Park**,
Daejeon (KR)

(73) Assignees: SK Innovation Co., Ltd., Seoul (KR);
SK Geo Centric Co., Ltd., Seoul (KR)

( * ) Notice: Subject to any disclaimer, the term of this
patent is extended or adjusted under 35
U.S.C. 154(b) by 961 days.

(21) Appl. No.: 17/963,485

(22) Filed: Oct. 11, 2022

(65) Prior Publication Data

US 2024/0117167 A1　Apr. 11, 2024

(51) Int. Cl.
C08L 23/0869　(2025.01)

(52) U.S. Cl.
CPC .................................. C08L 23/0869 (2013.01)

(58) Field of Classification Search
CPC .. C08L 23/0869; C08L 23/08; C08L 23/0815;
C08L 23/0853; C08L 2203/16; C08L
2205/025; C08L 2203/162; C08L
2205/03; C08L 23/0876; B32B 27/308;
B32B 27/06; B32B 27/306; B32B 27/32;
B32B 2307/7242; B32B 2307/734; B32B
2439/00; C08J 5/18; C08J 2323/08; C08J
3/005
See application file for complete search history.

(56) References Cited

U.S. PATENT DOCUMENTS

| | | | |
|---|---|---|---|
| 3,365,520 A | 1/1968 | Foster et al. | |
| 5,051,266 A * | 9/1991 | Juhl | C08L 23/0869 |
| | | | 428/35.4 |
| 6,476,137 B1 * | 11/2002 | Longo | C08L 23/20 |
| | | | 525/240 |
| 2020/0216661 A1 | 7/2020 | Liao et al. | |

FOREIGN PATENT DOCUMENTS

| | | |
|---|---|---|
| EP | 0432611 A2 | 6/1991 |
| EP | 0445955 A2 | 9/1991 |
| KR | 100843033 B1 | 7/2008 |
| KR | 20170023078 A | 3/2017 |
| KR | 101962536 B1 | 3/2019 |

* cited by examiner

*Primary Examiner* — Alicia Bland
(74) *Attorney, Agent, or Firm* — The Webb Law Firm

(57)　ABSTRACT

A low shrink tension packaging film contains a first polymer
that is an ethylene-unsaturated carboxylic acid copolymer
and a second polymer containing one or more copolymers
selected from an ethylene-vinyl acetate copolymer and an
ethylene-acrylate copolymer. A molar ratio of a specific
structural unit of the first polymer to a specific structural unit
of the second polymer is in a specific range, such that the
low shrink tension packaging film has excellent optical and
mechanical properties and a significantly low tension
applied when being shrunk by heat.

14 Claims, No Drawings

LOW SHRINK TENSION FILM

BACKGROUND OF THE INVENTION

Field of the Invention

The following disclosure relates to a low shrink tension film, and more particularly, to a low shrink tension film suitable for a packaging material of a product that is easily deformed by a pressure because deformation such as warpage of an object to be packaged may be minimized due to a significantly low shrink tension generated by heat when the low shrink tension film is used as a packaging film.

Description of Related Art

In general, a high shrink tension film is mainly used as a packaging film, and is widely used for objects for home and commercial uses suitable for shrink packaging of a food such as meat, an electric part such as a capacitor or a battery, and a fluorescent lamp using characteristics of large shrinkage and deformation due to heat. However, in a case where the high shrink tension film is used for an object that is easily physically deformed by a pressure, such as paper, fabric, a book, an air filter, or a sticker, the object to be packaged may be easily damaged by shrinkage of the film. Therefore, it is important that an object that is easily deformed by a pressure is packaged with a low shrink tension packaging film so as not to be damaged by shrinkage of the film.

However, in a packaging film field, studies on the low shrink tension film have not been conducted much compared to the high shrink tension film. The low shrink tension film according to the related art has been initially formed of polyvinyl chloride having a low shrink force, but there is a problem in that toxic hydrogen chloride is released during heat sealing or long-term storage, and thereafter, the low shrink tension film has thus been formed of a polyolefin material. Recently, a low shrink tension film is formed of a material such as polystyrene, polyethylene terephthalate, or polyamide, in addition to the polyolefin material.

However, a film having a lower shrink tension is still required, and further, a film having excellent transparency and excellent mechanical properties such as tensile strength is also required. Therefore, there is a need for studies on a packaging film that has a lower shrink tension generated by heat than that of the related art and has excellent optical and mechanical properties.

RELATED ART DOCUMENT

Patent Document

US 2020-0216661 A1

SUMMARY OF THE INVENTION

An embodiment of the present invention is directed to providing a low shrink tension packaging film having a significantly low shrink force generated by heat.

Another embodiment of the present invention is directed to providing a low shrink tension packaging film that may secure smooth moldability and processability when producing a film and has excellent optical and mechanical properties in addition to excellent low shrink tension properties.

In one general aspect, a polymer composition for a low shrink tension packaging film contains: a first polymer that is an ethylene-unsaturated carboxylic acid copolymer; and a second polymer containing one or more copolymers selected from an ethylene-vinyl acetate copolymer and an ethylene-acrylate copolymer, wherein a molar ratio of an unsaturated carboxylic acid structural unit of the first polymer to a hydrogen bonding functional group of the second polymer is 1:1 to 12.

A content of the unsaturated carboxylic acid structural unit of the first polymer may be 1 to 10 mol %.

A content of the hydrogen bonding functional group of the second polymer may be 2.5 mol % or more.

The first polymer may be contained in an amount of 55 to 90 wt %, and the second polymer may be contained in an amount of 10 to 45 wt %.

A ratio of a melt index (190° C./2.16 kg, ASTM D1238) of the first polymer to a melt index (190° C./2.16 kg, ASTM D1238) of the second polymer may be 1:1 to 9.

The polymer composition may further contain a third polymer that is a polyolefin elastomer copolymer.

The first polymer may be contained in an amount of 30 to 70 wt %, the second polymer may be contained in an amount of 10 to 40 wt %, and the third polymer may be contained in an amount of 15 to 50 wt %.

The ethylene-unsaturated carboxylic acid copolymer may be an ethylene-acrylic acid copolymer, an ethylene-(meth) acrylic acid copolymer, or a combination thereof.

The ethylene-acrylate copolymer may be an ethylene-(C1-C8) alkyl acrylate copolymer.

In another general aspect, there is provided a packaging film formed of the polymer composition for a low shrink tension packaging film.

An average thickness of the packaging film may be 10 to 500 μm.

A light transmittance of the packaging film may be 55% or more when being irradiated with light having a wavelength of 550 nm at a film thickness of 50 μm.

A shrinkage rate of the packaging film after being maintained at 120° C. for 30 seconds may be 80% or less.

The packaging film may be produced by: a mixing step of blending the first polymer and the second polymer to prepare a polymer composition for a low shrink tension packaging film; and an extrusion step of extruding and molding the polymer composition for a low shrink tension packaging film to produce a packaging film.

In the mixing step, the blending may be performed at a relative humidity of 70 to 100%.

Other features and aspects will be apparent from the following detailed description, and the claims.

DESCRIPTION OF THE INVENTION

Hereinafter, a low shrink tension packaging film according to the present invention will be described in detail.

Unless otherwise defined, all the technical terms and scientific terms used in the present specification have the general meanings as commonly understood by those skilled in the art to which the present invention pertains, and the description for the known function and configuration unnecessarily obscuring the gist of the present invention will be omitted in the following description.

Unless the context clearly indicates otherwise, the singular forms of the terms used in the present specification may be interpreted as including the plural forms.

A numerical range used in the present specification includes upper and lower limits and all values within these limits, increments logically derived from a form and span of a defined range, all double limited values, and all possible combinations of the upper and lower limits in the numerical range defined in different forms. Unless otherwise particularly defined in the present specification, all values out of the numerical range that may occur due to the rounding off of the experimental errors or values also fall within the defined numerical ranges.

The expression "comprises(s)" described in the present specification is intended to be an open-ended transitional phrase having an equivalent meaning to "include(s)", "contain(s)", "have (has)", or "is (are) characterized by", and does not exclude elements, materials, or steps, all of which are not further recited herein.

Unless otherwise defined, a unit of "%" used in the present specification unless specifically mentioned refers to "wt %".

The term "layer" described in the present specification means that each material forms a continuum and has a dimension having a small thickness relative to a width and a length. Accordingly, in the present specification, the term "layer" should not be interpreted as a two-dimensional flat plane.

The present invention relates to a packaging film. There is provided a packaging film having a significantly lower shrink tension compared to that of the related art by a composition of a polymer blend composition containing two or more polymers having different compositions and control of physical properties of the respective polymers under similar shrink rate. Therefore, when the film according to the present invention is used for packaging a product that is easily physically deformed by a pressure, such as paper, fabric, a book, an air filter, or a sticker, the film does not cause damage to the product. As a result, the film according to the present invention may be suitably used for a product that is easily deformed by a pressure.

Specifically, a polymer composition for a low shrink tension packaging film according to the present invention may contain: a first polymer that is an ethylene-unsaturated carboxylic acid copolymer; and a second polymer containing one or more copolymers selected from an ethylene-vinyl acetate (EVA) copolymer and an ethylene-acrylate (EA) copolymer, in which a molar ratio of an unsaturated carboxylic acid structural unit of the first polymer to a hydrogen bonding functional group of the second polymer is 1:1 to 12. More specifically, the molar ratio of an unsaturated carboxylic acid structural unit of the first polymer to a hydrogen bonding functional group of the second polymer may be 1:1 to 5, or 1:1 to 3.

In the polymer composition for a low shrink tension packaging film, the unsaturated carboxylic acid structural unit of the first polymer may have hydrogen (H)-bond donor properties, and may also have H-bond acceptor properties in some cases. The hydrogen bonding functional group of the second polymer may have H-bond acceptor properties with respect to the unsaturated carboxylic acid structural unit. Specifically, in a case where the second polymer is an ethylene-vinyl acetate copolymer, a hydrogen bonding functional group thereof may be an acetate group. In a case where the second polymer is an ethylene-acrylate copolymer, a hydrogen bonding functional group thereof may be an acrylate group.

In the present invention, when the molar ratio of the unsaturated carboxylic acid structural unit of the first polymer to the hydrogen bonding functional group of the second polymer is 1:1 to 12, low shrink tension properties are significantly improved. Specifically, the unsaturated carboxylic acid structural unit of the first polymer and the hydrogen bonding functional group of the second polymer form a hydrogen bond, which significantly reduces a shrink tension compared to a shrink tension generated by a recoil of the polymer chain with covalent bond when the film is shrunk by heat. In this case, when the molar ratio of the unsaturated carboxylic acid structural unit of the first polymer to the hydrogen bonding functional group of the second polymer is in the above range, in particular, a tension applied when the film is shrunk by heat is rapidly reduced. Specifically, the unsaturated carboxylic acid structural unit of the first polymer acts as an H-bond donor, and an intermolecular attraction is significantly increased due to an electrostatic attraction between the unsaturated carboxylic acid structural unit and the hydrogen bonding functional group of the second polymer having H-bond acceptor properties, and a heat shrink tension is significantly relieved. On the other hand, when the molar ratio is not in the above range, the formation of the hydrogen bond between the first polymer and the second polymer is insufficient and the effect of the low shrink tension is not significantly exhibited as compared to the related art. Therefore, it is not suitable for packaging a product that is easily physically deformed.

Preferably, when a content of the unsaturated carboxylic acid structural unit of the first polymer is 1 to 10 mol %, and specifically, 2 to 8 mol %, the heat shrink tension may be significantly relieved. In addition, when the content of the unsaturated carboxylic acid structural unit of the first polymer is 1 mol % or more, the low shrink tension properties are significantly improved, and when the content of the unsaturated carboxylic acid structural unit of the first polymer is 10 mol % or less, processability and moldability when producing a film are significantly improved. In this case, the content of the unsaturated carboxylic acid structural unit of the first polymer means the molar content of unsaturated carboxylic acid structural unit with respect to the total moles of structural units in the first polymer.

A content of the hydrogen bonding functional group of the second polymer may be adjusted so that the molar ratio of the unsaturated carboxylic acid structural unit of the first polymer to the hydrogen bonding functional group of the second polymer and the content of the unsaturated carboxylic acid structural unit of the first polymer are in the above ranges, and it is preferable that the content of the hydrogen bonding functional group of the second polymer is 2.5 mol % or more, specifically, 2.5 to 20 mol %, and more specifically, 3 to 15 mol %, from the viewpoint of improving the low shrink tension properties. In this case, the content of the hydrogen bonding functional group of the second polymer means the molar content of the hydrogen bonding functional group with respect to the total mole of structural units in the second polymer.

A composition ratio of the polymer composition for a low shrink tension packaging film according to the present invention may be appropriately adjusted so that the molar ratio or the molar ratio and mol % are in the above ranges, and for example, it is preferable that the first polymer is contained in an amount of 55 to 90 wt % and the second polymer is contained in an amount of 10 to 45 wt %. When the composition ratio of the polymer composition is in the above range, high moldability and processability when producing a film may be secured together with the excellent low shrink tension properties.

In a case where the second polymer contains both an ethylene-vinyl acetate copolymer and an ethylene-acrylate copolymer, a content ratio of each of these copolymers is not particularly limited, and for example, it is preferable that in the second polymer, the ethylene-acrylate copolymer is contained in an amount of 50 to 200 parts by weight with respect to 100 parts by weight of the ethylene-vinyl acetate copolymer.

As a preferred example, a ratio of a melt index (190° C./2.16 kg, ASTM D1238) of the first polymer to a melt index (190° C./2.16 kg, ASTM D1238) of the second polymer may be preferably 1:1 to 9, and specifically, 1:1.5 to 7, from the viewpoint of securing high moldability and processability when producing a film and implementing excellent low shrink tension properties.

The polymer composition for a low shrink tension packaging film according to an exemplary embodiment of the present invention may further contain a third polymer that is a polyolefin elastomer (POE) copolymer. In a case where the third polymer is contained, excellent low shrink tension properties may be appropriately secured and crystal formation of the polymer composition may be further inhibited. Therefore, it is possible to impart an effect of improving transparency. In the case where the third polymer is used, the composition ratio of the polymer composition for a low shrink tension packaging film is not particularly limited, and for example, it is possible to satisfy a composition ratio in which the first polymer is contained in an amount of 30 to 70 wt %, the second polymer is contained in an amount of 10 to 40 wt %, and the third polymer is contained in an amount of 15 to 50 wt %.

A weight average molecular weight of the first polymer, the second polymer, or the third polymer may be appropriately adjusted so that the properties described above are satisfied, and may be, for example, 30,000 to 200,000 g/mol. However, this is only described as a specific example, and the present invention is not limited thereto.

The first polymer that is an ethylene-unsaturated carboxylic acid copolymer, the second polymer that is an ethylene-vinyl acetate copolymer or an ethylene-acrylate copolymer, and the third polymer that is a polyolefin elastomer copolymer described in the present invention are known materials and may be prepared by referring to a known document so as to satisfy the physical properties described above.

Specifically, the ethylene-unsaturated carboxylic acid copolymer may be an ethylene-acrylic acid copolymer, an ethylene-(meth)acrylic acid copolymer, an ethylene-ethacrylic acid copolymer, an ethylene-crotonic acid copolymer, or a combination thereof. More specifically, the ethylene-unsaturated carboxylic acid copolymer may be an ethylene-acrylic acid copolymer, an ethylene-(meth)acrylic acid copolymer, or a combination thereof.

The ethylene-acrylate copolymer may be a polymer obtained by copolymerizing an ethylene-based monomer and an acrylate-based monomer, and may be preferably an ethylene-(C1-C8) alkyl acrylate copolymer, and specifically, an ethylene-(C1-C6) alkyl acrylate copolymer. Here, the "alkyl" may include both a linear form and a branched form, and may have 1 to 8 carbon atoms, and preferably, 1 to 6 carbon atoms. Specifically, the ethylene-alkyl acrylate copolymer may be a polymer obtained by polymerizing an ethylene-based monomer and a monomer including one or two or more selected from methyl acrylate, ethyl acrylate, propyl acrylate, butyl acrylate, heptyl acrylate, hexyl acrylate, and ethylhexyl acrylate. Examples of the ethylene-alkyl acrylate copolymer include an ethylene-methyl acrylate (EMA) copolymer, an ethylene-ethyl acrylate copolymer, an ethylene-propyl acrylate copolymer, an ethylene-butyl acrylate copolymer, an ethylene-heptyl acrylate copolymer, an ethylene-hexyl acrylate copolymer, and an ethylene-ethylhexyl acrylate copolymer.

A film may be produced by performing molding such as extrusion and processing on the polymer composition for a low shrink tension packaging film containing the first polymer and the second polymer or the first polymer to the third polymer according to the present invention, and the film may be used for packaging a suitable product.

The packaging film formed of the polymer composition for a low shrink tension packaging film according to the present invention may be a single-layer film formed of the composition and may be a multi-layer laminate film including layers formed of the composition in order to impart various functions and improve specific properties. For example, a laminate film in which a layer formed of the composition and a layer having a low gas permeability are combined may be provided to provide a film having a low gas (oxygen or the like) permeability.

In addition, in order to impart various functions to a film formed of the polymer composition for a low shrink tension packaging film according to the present invention or to improve specific properties of the film, additional additives may be used together with the composition. Examples of the additional additives may include one or a combination of two or more selected from a flame retardant, an antioxidant, a processing stabilizer, a processing aid, a lubricant, a filler, a reinforcing agent, a weather resistant stabilizer, an anti-static agent, a slip agent, a plasticizer, a heat stabilizer, a pigment, an antibacterial agent, and a UV stabilizer. In a case where the additional additives are used, a content of the additional additives used may be adjusted to the extent that the effects described above are implemented and other side effects are not caused. For example, the additional additives may be used in an amount of 0.001 to 10 parts by weight with respect to 100 parts by weight of the composition. The additional additives may be used by a simple method such as mixed with the composition. However, this is only described as a specific example, and the present invention is not limited thereto.

The packaging film formed of the polymer composition for a low shrink tension packaging film according to the present invention has a significantly low tension applied when being heat shrunk compared to that of the related art. Specifically, a shrinkage rate of the packaging film according to the present invention when being maintained at a relatively high temperature of 120° C. for 30 seconds may be 80% or less, preferably 50% to 80%, which may be similar to a shrinkage rate of a commercially available film. Therefore, the packaging film according to the present invention has a significantly low heat shrink tension.

In addition, the packaging film formed of the polymer composition for a low shrink tension packaging film according to the present invention has an appropriate light transmittance of 55% or more at the film thickness of 50 μm based on irradiation with light having a wavelength of 550 nm, and has a significantly low tension generated when being heat shrunk.

An average thickness of the packaging film formed of the polymer composition for a low shrink tension packaging film according to the present invention may be set in a range in which it may be used as a packaging film, and may be, for example, 10 to 500 μm, and specifically, 20 to 100 μm. However, this is only described as a specific example, and the average thickness of the packaging film may be appropriately controlled to satisfy properties such as mechanical properties such as tensile strength and optical properties such as a light transmittance. Therefore, the present invention is not construed as being limited thereto.

The packaging film formed of the polymer composition for a low shrink tension packaging film according to an exemplary embodiment of the present invention may be produced by: a mixing step of blending the respective polymers (the first polymer and the second polymer or the first polymer to the third polymer) to prepare a polymer composition for a low shrink tension packaging film; and an extrusion step of extruding and molding the polymer composition for a low shrink tension packaging film to produce a packaging film. A blending temperature may be equal to or lower than a temperature at which the respective polymers may be sufficiently melted to be mixed with each other and thermally decomposed, and a blending time may be sufficient as long as the respective polymers may be sufficiently mixed with each other.

In the mixing step, the blending may be freely performed at a relative humidity of 0 to 100%, and the blending may be preferably dry blending performed under an environment in which a relative humidity is 70% or more, and specifically, 70 to 100%, from the viewpoint of improving hydrogen bonding properties of an H-bond donor group and an H-bond acceptor group of each polymer and further improving a heat shrink tension of a film to be produced.

In the extrusion step, a unit for extruding and molding the known polymer may be used, and for example, a unit for producing a wrap film that molds a blended composition sufficiently kneaded in an extruder into a film by a T-die may be used.

Hereinafter, the present invention will be described in detail with reference to Examples. However, these Examples are intended to describe the present invention in more detail, and the scope of the present invention is not limited by the following Examples.

Examples 1 to 4

A blended composition of a first polymer and a second polymer (Examples 1 to 3) or a blended composition of a first polymer to a third polymer (Example 4) was prepared in a composition ratio shown in Table 1. In addition, the blended composition was mixed in a dry blending manner and then fed into an extruder at 50 rpm to produce a blown film having a perimeter of 30 cm and a thickness of 50 μm.

In this case, an ethylene-acrylic acid copolymer (PRIMA-COR™ 1410, SK Chemicals) was used as the first polymer, an ethylene-vinyl acetate copolymer (EVATANER 28-03, SK Functional Polymer) or an ethylene-methyl acrylate copolymer was used as the second polymer, and a polyolefin elastomer copolymer (Solumer™ 871, SK global chemical Co., Ltd.) was used as the third polymer. In addition, LOTRYL® 29MA03T having 11.8 mol % of a comonomer or LOTRYL® 20MA08T having 7.5 mol % of a comonomer was used as the ethylene-methyl acrylate copolymer.

Comparative Examples 1 to 6

PUMA blown film was produced by applying a composition ratio shown in Table 1 to the production method of the blown film of Example 1. In this case, in Comparative Examples 2 to 5, ethylene-acrylic acid copolymers having different mol % of comonomers were used as first polymers as shown in Table 1. U.S. Pat. No. 4,599,392 A may be referred to for a specific production method thereof.

TABLE 1

| | First polymer | | | Second polymer or Third polymer | | | | | | | | |
| | EAA | | | EVA | | | EMA | | | POE | HB acceptor ratio to | |
| | Content (wt %) | Comonomer (mol %) | MI | Content (wt %) | Comonomer (mol %) | MI | Content (wt %) | Comonomer (mol %) | MI | (wt %) | AA (AA/HB) | MI ratio |
|---|---|---|---|---|---|---|---|---|---|---|---|---|
| Example 1 | 50 | 4 | 1.7 | 50 | 11.2 | 4 | | | | | 1:2.80 | 1:2.35 |
| Example 2 | 50 | 4 | 1.7 | | | | 50 | 11.8 | 8 | | 1:2.95 | 1:4.71 |
| Example 3 | 50 | 4 | 1.7 | | | | 50 | 7.5 | 8 | | 1:1.88 | 1:4.71 |
| Example 4 | 50 | 4 | 1.7 | 20 | 11.2 | 4 | | | | 30 | 1:1.12 | 1:2.35 |
| Comparative Example 1 | 100 | 4 | 1.7 | | | | | | | | | |
| Comparative Example 2 | 50 | 0.8 | | 50 | 11.2 | 4 | | | | | 1:14.00 | |
| Comparative Example 3 | 50 | 12 | | 50 | 11.2 | 4 | | | | | 1:0.93 | |
| Comparative Example 4 | 50 | 0.8 | | | | | 50 | 11.8 | 8 | | 1:14.75 | |
| Comparative Example 5 | 50 | 12 | | | | | 50 | 7.5 | 8 | | 1:0.63 | |
| Comparative Example 6 | 50 | 4 | 1.7 | | | | | | | 50 | | |

EAA: Ethylene-acrylic acid copolymer (PRIMACOR ™ 1410, SK global chemical Co., Ltd.)

EVA: Ethylene-vinyl acetate copolymer (EVATANE$^R$ 28-03, SK Functional Polymer)

EMA: Ethylene-methyl acrylate copolymer (LOTRYL$^R$ 29MA03T, SK functional polymer) (LOTRYL$^R$ 20MA08T, SK Functional Polymer)

POE: Polyolefin elastomer copolymer (Solumer ™ 871, SK global chemical Co., Ltd.)

AA/HB: Molar ratio of acrylic acid structural unit of first polymer to hydrogen bonding functional group of second polymer MI: Melt index (190° C./2.16 kg, ASTM D1238)

MI ratio: Ratio of melt index of first polymer to melt index of second polymer

[Heat Shrink Tension Test]

A shrink force of the blown film produced in each of Examples or Comparative Examples was measured by the following method. Specifically, in order to measure the shrink force, a sample was prepared by laminating three films cut into 15 cm of each of Examples or Comparative Examples and folding the films twice. Subsequently, the sample was injected into an oven connected to a LLOYD machine, the sample was heated to 85° C. and maintained for 10 minutes, and then, a maximum load was recorded. At this time, a test length for measuring the shrink force was 10 cm. The test results of the shrink force are shown in Table 2.

[Heat Shrink Rate Test]

A shrink rate of the blown film produced in each of Examples or Comparative Examples was measured by the following method. Specifically, in order to measure the shrink rate, a sample was prepared by laminating films cut into 15 cm by 15 cm of each of Examples or Comparative Examples. Subsequently, the sample was injected into an oven heated to 120° C. The sample was taken out of the oven after 30 seconds has passed and shrunken length with mechanical direction was recorded. The test results of the shrink rate are shown in Table 2.

In addition, a light transmittance (clarity) of the blown film produced in each of Examples or Comparative Examples was measured by the following method. The measurement results are shown in Table 2. Specifically, the blown film cut into 3 cm in width and length was used as the sample, and the light transmittance was measured with a light transmittance measuring device (CM-5, Konica Minolta, Inc.). At this time, a wavelength of the irradiated light during the measurement was 550 nm.

copolymer or an ethylene-methyl acrylate (EMA) copolymer are blended, low shrink properties are significantly improved.

In addition, it is clearly confirmed from the comparison of Examples 1 to 4 and Comparative Examples 2 to 5 that even in a case where a film is produced by blending the ethylene-acrylic acid (EAA) copolymer that is the first polymer and the second polymer, when a molar ratio (AA/HB) of an acrylic acid structural unit of the ethylene-acrylic acid (EAA) copolymer to a hydrogen bonding functional group of the second polymer is 1:1 to 12, the low shrink properties are significantly improved.

In addition, although not shown in the table, it was confirmed that when the number of hydrogen bonding functional groups that were H-bond acceptor groups of the second polymer was increased with respect to the acrylic acid structural unit that was an H-bond donor group of the first polymer, the low shrink tension properties were improved.

In addition, it was observed that when the acrylic acid structural unit of the ethylene-acrylic acid (EAA) copolymer that was the first polymer was more than 10 mol %, molding defects occurred, resulting in difficulty of the film production itself.

Therefore, it can be appreciated from Table 2 that among the Examples, when the molar ratio (AA/HB) of the acrylic acid structural unit of the first polymer to the hydrogen bonding functional group of the second polymer is 1:1 to 12 and the content of the acrylic acid structural unit of the first polymer is 1 to 10 mol %, the most excellent low shrink tension properties are exhibited.

TABLE 2

| | First polymer EAA | | Second polymer or Third polymer | | | | | HB acceptor ratio to AA (AA/HB) | Shrink force (%) | Light transmittance (%) | Shrink rate (120° C., 30 s, %) |
| | | | EVA | | EMA | | POE | | | | |
| | Content (wt %) | Comonomer (mol %) | Content (wt %) | Comonomer (mol %) | Content (wt %) | Comonomer (mol %) | (wt %) | | | | |
| Example 1 | 50 | 4 | 50 | 11.2 | | | | 1:2.80 | 69 | 61.3 | 65.1 |
| Example 2 | 50 | 4 | | | 50 | 11.8 | | 1:2.95 | 59 | 58.3 | 76.9 |
| Example 3 | 50 | 4 | | | 50 | 7.5 | | 1:1.88 | 69 | 58.5 | 68.3 |
| Example 4 | 50 | 4 | 20 | 11.2 | | | 30 | 1:1.12 | 77 | 60.4 | 70.1 |
| Comparative Example 1 | 100 | 4 | | | | | | | 100 | 61.5 | 66.0 |
| Comparative Example 2 | 50 | 0.8 | 50 | 11.2 | | | | 1:14.00 | 91 | 61.4 | 68.6 |
| Comparative Example 3 | 50 | 12 | 50 | 11.2 | | | | 1:0.93 | Film cannot be molded | | |
| Comparative Example 4 | 50 | 0.8 | | | 50 | 11.8 | | 1:14.75 | 95 | 58.8 | 73.4 |
| Comparative Example 5 | 50 | 12 | | | 50 | 7.5 | | 1:0.63 | Film cannot be molded | | |
| Comparative Example 6 | 50 | 4 | | | | | 50 | | Film cannot be molded | | |

EAA: Ethylene-acrylic acid copolymer (PRIMACOR™ 1410, SK global chemical Co., Ltd.)
EVA: Ethylene-vinyl acetate copolymer (EVATANE$^R$ 28-03, SK Functional Polymer)
EMA: Ethylene-methyl acrylate copolymer (LOTRYL$^R$ 29MA03T, SK functional polymer) (LOTRYL$^R$ 20MA08T, SK Functional Polymer)
POE: Polyolefin elastomer copolymer (Solumer™ 871, SK global chemical Co., Ltd.)
AA/HB: Molar ratio of acrylic acid structural unit of first polymer to hydrogen bonding functional group of second polymer Referring to Table 2, it is clearly confirmed from the comparison of Examples 1 to 4 and Comparative Example 1 that in a case where the film is produced using an ethylene-acrylic acid (EAA) copolymer, when the ethylene-acrylic acid (EAA) copolymer that is the first polymer and the second polymer that is an ethylene-vinyl acetate (EVA)

As set forth above, the low shrink tension packaging film may have a significantly low shrink force generated by heat.

Further, the low shrink tension packaging film according to the present invention may secure smooth moldability and processability when producing a film and may have excellent optical and mechanical properties in addition to excellent low shrink tension properties.

Hereinabove, although the present invention has been described by specific matters and limited exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

The invention claimed is:

1. A polymer composition for a low shrink tension packaging film, comprising:
   a first polymer that is an ethylene-unsaturated carboxylic acid copolymer, wherein the ethylene-unsaturated carboxylic acid copolymer is an ethylene-acrylic acid copolymer, an ethylene-(meth)acrylic acid copolymer, or a combination thereof; and
   a second polymer containing one or more copolymers selected from an ethylene-vinyl acetate copolymer and an ethylene-acrylate copolymer,
   wherein a molar ratio of an unsaturated carboxylic acid structural unit of the first polymer to a hydrogen bonding functional group of the second polymer is 1:1 to 12,
   wherein a ratio of a melt index (190° C./2.16 kg, ASTM D1238) of the first polymer to a melt index (190° C./2.16 kg, ASTM D1238) of the second polymer is 1:1 to 9, and wherein a shrink force of the film ranges from 59% to 77%.

2. The polymer composition of claim 1, wherein a content of the unsaturated carboxylic acid structural unit of the first polymer is 1 to 10 mol %.

3. The polymer composition of claim 2, wherein a content of the hydrogen bonding functional group of the second polymer is 2.5 mol % or more.

4. The polymer composition of claim 1, wherein the first polymer is contained in an amount of 55 to 90 wt %, and the second polymer is contained in an amount of 10 to 45 wt %.

5. The polymer composition of claim 1, further comprising a third polymer that is a polyolefin elastomer copolymer.

6. The polymer composition of claim 5, wherein the first polymer is contained in an amount of 30 to 70 wt %, the second polymer is contained in an amount of 10 to 40 wt %, and the third polymer is contained in an amount of 15 to 50 wt %.

7. The polymer composition of claim 1, wherein the ethylene-acrylate copolymer is an ethylene-(C1-C8) alkyl acrylate copolymer.

8. The polymer composition of claim 1, wherein the second polymer contains the ethylene-acrylate copolymer.

9. A packaging film formed of the polymer composition of claim 1.

10. The packaging film of claim 9, wherein an average thickness of the packaging film is 10 to 500 μm.

11. The packaging film of claim 10, a light transmittance of the packaging film when being irradiated with light having a wavelength of 550 nm at a film thickness of 50 μm is 55% or more.

12. The packaging film of claim 9, wherein a shrinkage rate of the packaging film after being maintained at 120° C. for 30 seconds is 80% or less.

13. The packaging film of claim 9, wherein the packaging film is produced by:
   a mixing step of blending the first polymer and the second polymer to prepare a polymer composition for a low shrink tension packaging film; and
   an extrusion step of extruding and molding the polymer composition for a low shrink tension packaging film to produce a packaging film.

14. The packaging film of claim 13, wherein in the mixing step, the blending is dry blending performed at a relative humidity of 70 to 100%.

* * * * *